United States Patent [19]

Noda

[11] Patent Number: 5,703,849
[45] Date of Patent: Dec. 30, 1997

[54] TRACKING SERVO CORRECTION CONTROL CIRCUIT

[75] Inventor: Hidenobu Noda, Kanagawa, Japan

[73] Assignee: Sony Corporation, Japan

[21] Appl. No.: 634,767

[22] Filed: Apr. 19, 1996

[30] Foreign Application Priority Data

Apr. 28, 1995 [JP] Japan .................................. 7-106496

[51] Int. Cl.$^6$ .................................................. G11B 7/095
[52] U.S. Cl. ............................ 369/44.29; 369/44.35; 369/44.32
[58] Field of Search ........................ 369/44.35, 44.29, 369/44.32, 44.34, 54

[56] References Cited

U.S. PATENT DOCUMENTS

| | | | |
|---|---|---|---|
| 5,014,256 | 5/1991 | Horie et al. | 369/44.35 |
| 5,151,888 | 9/1992 | Shikichi et al. | 369/44.32 |
| 5,590,103 | 12/1996 | Noda | 369/44.29 |

FOREIGN PATENT DOCUMENTS 6-162544  6/1994  Japan .

Primary Examiner—Thang V. Tran
Attorney, Agent, or Firm—Ronald P. Kananen

[57] ABSTRACT

In a tracking servo circuit for such as an optical disc device, and the like, a tracking error signal TE obtained in a servo-off state is subjected to A/D conversion, the center level thereof is calculated at a center level computation circuit, that value is stored in a register, at a time of servo-on, switches are connected to one terminal side, in the normal operation mode, the center level stored in the register is subtracted from the tracking error signal TE obtained at the time of the servo-on state at the subtraction circuit, the offset of the tracking error signal is corrected, and when light reflected from the surface of the disc can no longer be obtained due to an accidental cause, the connection of another switch is switched to the terminal b in response to the switching of the signal FOK generated based on the RF signal to the low level, and the offset correction operation of the tracking error signal TE is stopped.

12 Claims, 4 Drawing Sheets

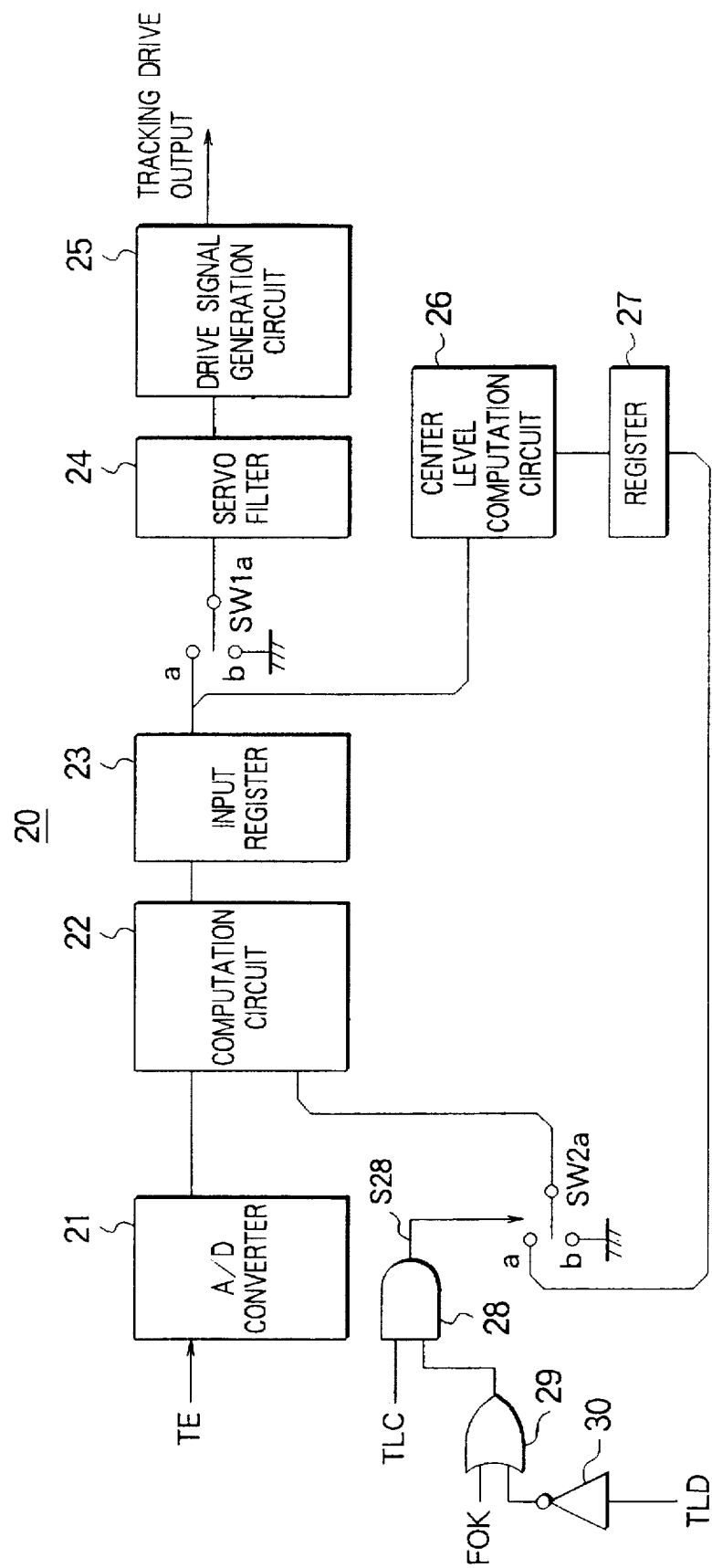

FIG. 5A  TE  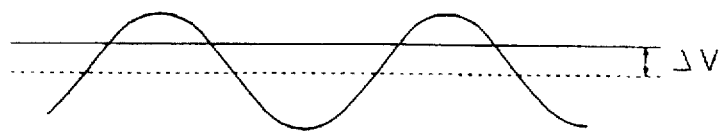
FIG. 5B  FOX  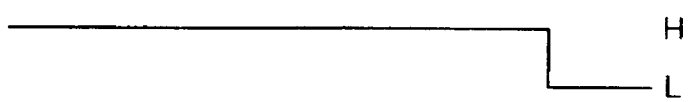
FIG. 5C  TESF (TLD=H)  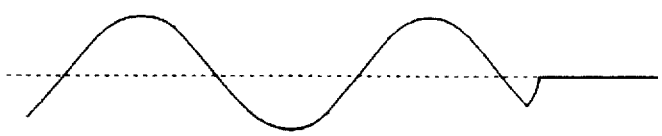
FIG. 5D  TESF (TLD=L)  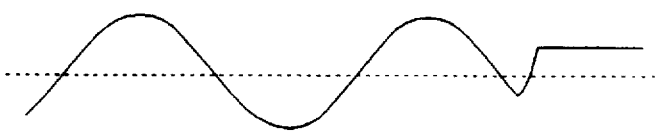

TRACKING SERVO CORRECTION CONTROL CIRCUIT

BACKGROUND OF THE INVENTION

1. Field of the Invention

The present invention relates to a tracking servo circuit adopted in an optical disc device, and the like, such as a CD player.

2. Description of the Related Art

In an optical disc player, correct reading of the pit information recorded on the disc requires tracking servo control for controlling the relative position of a light beam spot with respect to the tracks of the disc in the radial direction of the disc so that the light beam spot for reading the information correctly tracks the track comprised of successive bits.

In this tracking servo control, control is carried out so that deviation of the light beam spot with respect to the tracks in the radial direction of the disc is detected as a tracking error signal based on the light beam reflected from the disc surface and the tracking actuator is driven by a drive voltage in accordance with the magnitude of the tracking error signal, whereby the position of the light beam spot is continuously corrected so that the light beam spot always tracks the center of the track.

As a representative example of the method of generating the tracking error signal, the three-beam system is well known.

The three-beam system uses three light beams irradiated onto the same straight line at equal intervals. The straight line and the track of the disc are held continuously constant in angle.

Among the three light beams, the center main beam is used for reading the information and the focus servo, while the two light beams on the two sides thereof are used for the tracking servo.

Concretely, the light beam reflected from the surface of the disc based on the two light beams on the two sides is received by two photodetectors. The difference of the outputs of these two photodetectors is used as the tracking error signal.

This tracking error signal exhibits a so-called S-curve characteristic which ideally becomes "0" when the spot of the main beam is located at the center of the track and becomes a magnitude in accordance with the amount of deviation with a polarity corresponding to the direction of deviation when the main beam spot is deviated from the center of the track.

Where there exists a difference of sensitivity between the two photodetectors for the tracking servo, however, a DC offset of the tracking error signal is generated, so the tracking error signal does not become "0" irrespective of the fact that the spot of the main beam is positioned at the center of the track.

In this case, an adverse influence is exerted upon the play ability of the disc player if this state is continued.

Therefore, conventionally, variable technologies for canceling the DC offset of the tracking error signal have been proposed. The applicant has also proposed a tracking servo circuit which automatically corrects the amount of unbalance of the photodetectors and the like in a digital servo IC (refer to Japanese Unexamined Patent Publication (Kokai) No. 6-162544).

FIG. 1 is a block diagram showing the configuration of this tracking servo circuit 10.

This tracking servo circuit 10 is constituted by an analog/digital(A/D) converter 1, a subtraction circuit 2, an input register 3, a tracking servo filter 4, a drive signal generation circuit 5, a center level computation circuit 6, a register 7, and switches SW1 and SW2.

In such a configuration, first, when the tracking servo is in an OFF state, if the disc is rotated, a so-called traverse waveform is generated in the tracking error signal TE and the tracking error signal TE generated in a not illustrated RF amplifier is input to an analog/digital(A/D) converter 1.

At this time, the switches SW1 and SW2 are connected to a terminal b side, while the traverse waveform converted to the digital signal passes through the tracking input register 3 and is input to the center level computation circuit 6.

The center level computation circuit 6 has a low-pass filter (LPF) having a DC gain equal to 0 constituted by for example a digital filter. For the input traverse waveform, a center level is calculated here. This value is stored in the register 7 for holding the traverse center level.

Here, when the tracking servo becomes ON, the connection of the switches SW1 and SW2 is switched from the terminal b to the terminal a.

By this, in the subtraction circuit 2, the traverse center level stored in the register 7 is subtracted from the tracking error signal TE input via the A/D converter 1. The tracking error signal which is input to the tracking servo filter 4 via the switch SW1 becomes a signal obtained by correcting the amount of unbalance of the photodetectors and the like. The tracking drive output is obtained at the drive signal generation circuit 15 based on this signal.

However, in a so-called correction-on state, where the disc player is in the middle of a playback operation, and so forth when light reflected from the surface of the disc can no longer be obtained due to some sort of accidental cause, for example, the existence of a scratch on the surface of the disc, the tracking error signal TE generated in the not illustrated RF amplifier becomes almost "0".

At this time, in the above tracking servo circuit 10, since the switches SW1 and SW2 are connected to the terminal a side, only the amount of subtraction of the traverse center level is input to the tracking servo filter 4 as the DC value by the subtraction circuit 2.

The servo filter of the tracking or sled has a high gain in the low band region by nature. Therefore when a direct current of a certain large extent is continuously input, there is a possibility that a very large servo output will be obtained or an abnormally large amount of data will be held inside the filter and the servo loop will over-run.

Accordingly, in a state where the light reflected from the surface of the disc is normally obtained, the DC component contained in the tracking error signal TE generated by the RF amplifier based on the reflected light and the amount of subtraction of the traverse center level are canceled; therefore a large DC component is not input to the tracking servo filter 4. However, as mentioned above, in a state where light reflected from the surface of the disc is not obtained, the DC value of exactly the amount of subtraction of the traverse center level remains, so there is a possibility of over-run of the tracking/sled servo.

SUMMARY OF THE INVENTION

The object of the present invention is to provide a tracking servo circuit which can prevent the over-run of the tracking/sled servo and can realize a more stable tracking/sled servo operation.

To attain the above object, the present invention provides a tracking servo circuit which obtains a drive output for correction of the position of the light irradiated on the surface of a recording medium by a tracking error signal obtained in accordance with the level of reflection of light irradiated to the surface of the medium comprising: a first circuit which obtains a predetermined level of the tracking error signal obtained before the servo-on state is established from the start of driving; a register which holds said predetermined level of tracking error signal obtained by the first circuit; a second circuit which corrects said predetermined level of the tracking error signal obtained in the servo-on state based on said predetermined level held in the registers and a third circuit which stops the correction operation of the second circuit when a reflection light from the surface of the medium can no longer be obtained at the time of the servo-on state.

According to the tracking servo circuit of the present invention, for example, in a servo-off state from when the disc medium is driven to rotate until it becomes a servo-on state, the center level of the tracking error signal obtained in accordance with the reflection of the light irradiated on the surface of the medium is obtained in the first circuit, and this center level is held in the register.

When it enters the servo-on state, in the second circuit, the center level of the tracking error signal obtained in the servo-on state is corrected based on the center level held in the register. The corrected tracking error signal is input to the servo filter and a drive output for correcting the position of the light irradiated on the surface of the medium is obtained.

When it becomes impossible to obtain light reflected from the surface of the disc of the medium due to some sort of accidental cause, for example, the existence of a scratch on the surface of the disc of the medium, the correction operation of the second circuit is stopped by a third circuit.

By this, the level of the tracking error signal becomes "0", but is not corrected and input to the servo filter as it is. Accordingly, the DC component of exactly the amount of correction is continuously input to the servo filter and the tracking servo does not over-run.

According to the tracking servo circuit of the present invention, an over-run of the tracking servo or the sled servo can be prevented, and there is an advantage that a more stable tracking/sled servo operation can be realized.

BRIEF DESCRIPTION OF THE DRAWINGS

These and other objects and features of the present invention will be clear from the following description of the preferred embodiments made with reference to the attached drawings, in which:

FIG. 4 is a block diagram showing one embodiment of the tracking servo circuit of the optical disc player according to the present invention;

FIG. 5a is a view showing a waveform of the operation of the circuit of FIG. 4;

FIG. 5b is a view showing a waveform of the operation of the circuit of FIG. 4;

FIG. 5c is a view showing a waveform of the operation of the circuit of FIG. 4; and FIG. 5d is a view showing a waveform of the operation of the circuit of FIG. 4.

DESCRIPTION OF THE PREFERRED EMBODIMENTS

Preferred embodiments of the present invention will now be explained in detail with reference to the drawings.

Figure 2:
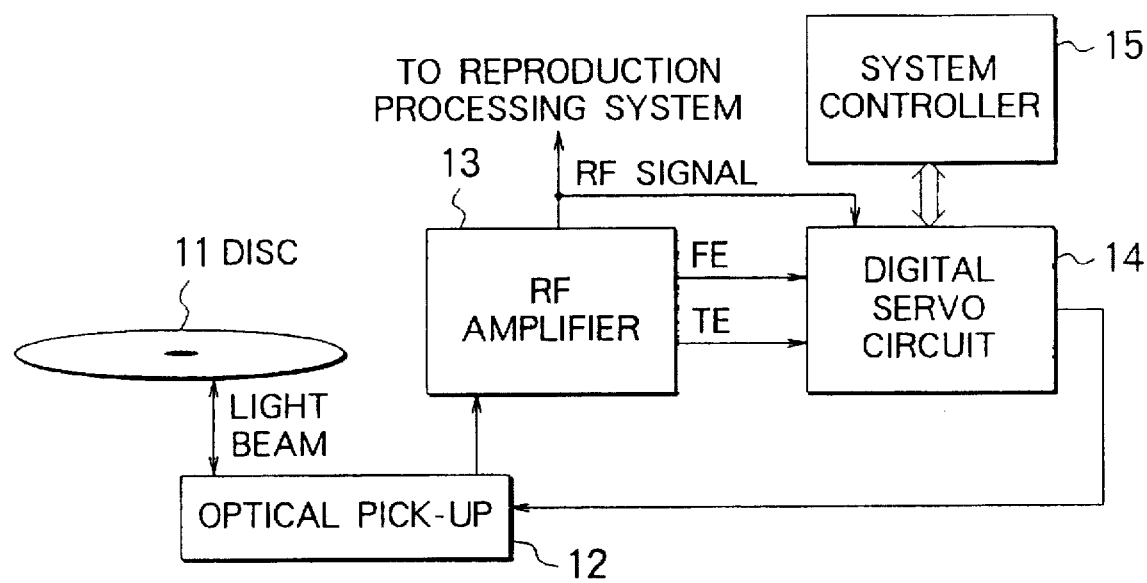
FIG. 2 is a system block diagram showing an example of the configuration of an optical disc player to which a tracking servo circuit according to the present invention is applied.

FIG. 2 is a block diagram showing an example of the configuration of the optical disc player to which the tracking servo circuit according to the present invention is applied.

In FIG. 2, the recorded information of the disc 11 is read by the optical pick-up 12.

The optical pick-up 12 includes a focus actuator which drives the object lens in the light axis direction thereof so as to focus the light beam to be irradiated to the disc 11 on the surface of the disc, a tracking actuator which moves the light beam spot focused on the surface of the disc in the radial direction of the disc 11, and a photodetector receiving the light beam reflected from the surface of the disc based on three light beams irradiated to the disc 11, and, so forth is moveable in the radial direction of the disc 11.

Figure 3:
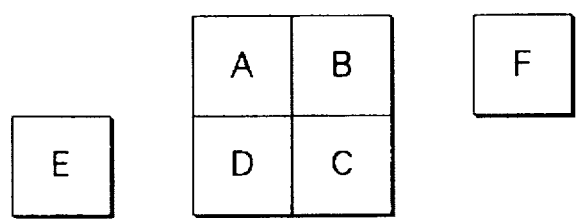
FIG. 3 is a view of the arrangement of a photodiode in the optical pick-up of FIG. 2.

The light detector included in the optical pick-up is constituted by, as shown in FIG. 3, four integrally formed photodiodes A to D receiving the reflected light beam based on the main beam among the three light beams and a pair of photodiodes E and F receiving the reflected light beam based on the two light beams on the two sides thereof.

The outputs of the four photodiodes A to D and the outputs of the pair of photodiodes E and F are supplied to the RF amplifier 13.

In the RF amplifier 13, based on the outputs of the four photodiodes A to D, a focus error signal FE and RF signal used for the driving of the focus actuator are generated. A tracking error signal TE used for driving the tracking actuator is generated based on the outputs of the pair of photodiodes E and F.

These RF signal, focus error signal FE, and tracking error signal TE are output to the digital servo circuit 14. Further, the RF signal is output also to a not illustrated reproduction processing system and used for the demodulation of the digital data.

The digital servo circuit 14 has the function of correcting the unbalance of sensitivity of the photodiodes E and F, and so forth as will be mentioned later and generates a signal FOK indicating that the RF signal generated in the RF amplifier 13 becomes a predetermined level or more based on the reflected light. It supplies this to the tracking servo system and focus servo system.

The signal FOK is set at a high level when the RF signal becomes a predetermined level or more and is set at a low level when the reflected light is not obtained due to a certain cause and the RF signal becomes the predetermined level or less.

In the tracking servo system, it is used for control of the correction of the unbalance of sensitivity of the photodiodes E and F etc. More specifically, when the signal FOK is at a low level, the correction operation is stopped.

Further, in the focus servo system, the signal FOK is used for confirming that a certain level or more of light reflected from the surface of the disc is obtained when performing the focus search operation.

The system controller 15 is constituted by a microprocessor and controls the entire system such as the control of the digital servo circuit 14.

FIG. 4 is a block diagram showing an embodiment of the tracking servo circuit of the optical disc player according to the present invention. The circuit constitutes one part of the digital servo circuit 14.

Namely, the tracking servo circuit 20 is constituted by an A/D converter 21, a subtraction circuit 22, an input register 23, a tracking servo filter 24, a drive signal generation circuit 25, a center level computation circuit 26, a register 27, an AND gate 28, an OR gate 29, an inverter 30, and switches SW1a and SW2a.

TLC denotes a tracking level control signal and TLD denotes a tracking level disable signal. The two signals TLC and TLD are supplied from for example the system controller 15 shown in FIG. 2.

The level control signal TLC is input to one input of the AND gate 28, while the output signal of the OR gate 29 is input to the other input.

The signal FOK is input to one input of the OR gate 29, and the level disable signal TLD inverted in level at the inverter 30 is input to the other input.

The switching operation of the switch SW2a is controlled by the output signal S28 of the AND gate 28. More specifically, when the signal S28 is at the high level, it is connected to the terminal a, and when the signal S28 is at the low level, it is connected to the terminal b.

Note that the switch SW1a is subjected to switching control by the system controller 15 shown in FIG. 2. By switching of the connection of the switch SW1a to the terminal a, the tracking servo becomes ON in state, and by switching of the same to the grounded terminal b, the tracking servo becomes OFF in state Next, the operation of the above configuration will be explained referring to FIGS. 5a to 5d.

In FIGS. 5a to 5d, the signal waveform indicated by TESF shows the tracking error signal at the servo filter 24. Note that, here, an explanation is made by taking as an example a case where the tracking disable signal TLD is set at the high level "H". Note, the level of this tracking disable signal TLD can be freely switched.

First, when the tracking servo is in the OFF state, when the disc 11 is rotated, a so-called traverse waveform is generated in the tracking error signal TE, and the tracking error signal TE shown in FIG. 5a generated in the RF amplifier 13 is input to the A/D converter 21.

At this time, the switches SW1a and SW2a are connected to the terminal b side, and the traverse waveform converted to the digital signal is input to the center level computation circuit 26 after passing through the tracking input register 23.

The center level computation circuit 26 has a low-pass filter (LPF) having a DC gain equal to 0 constituted by for example a digital filter. The center level of the input traverse waveform is calculated here. This value V is stored in the register 27 for holding the traverse center level.

Here, when the tracking servo becomes ON in state, based on the control of the system controller 15 shown FIG. 2 the connection of the switch Sw1a is switched from the terminal b to the terminal a.

Further, in the RF amplifier 13 shown FIG. 2, the RF signal is generated and input to the digital servo circuit 14. If there is no abnormality, as shown in FIG. 5b, a signal FOK of a high level indicating that the RF signal becomes the predetermined level or more is generated and is input to the OR gate 29.

As a result, the output of the OR gate 29 becomes the high level. At this time, the control signal TLC is also set at the high level under the control of the system controller 15 shown FIG. 2. Accordingly, the output signal S28 of the AND gate 28 becomes the high level and is supplied to the switch SW2a. By this, the connection of the switch SW2a is switched from the terminal b to the terminal a.

Along with this, in the subtraction circuit 22, the traverse center level V stored in the register 27 is subtracted from the tracking error signal TE input via the A/D converter 21. The tracking error signal input to the tracking servo filter 24 via the switch SW1a becomes the signal corrected in the amount of unbalance of photodetectors etc. as shown in FIG. 5c. The tracking drive output is obtained at the drive signal generation circuit 25 based on this signal.

Here, where the disc player is in the middle of a reproduction operation in the correction-on state, if the light reflected from the surface of the disc can no longer be obtained due to some sort of accidental cause, for example, the existence of a scratch on the surface of the disc, the level of the tracking error signal TE generated in the RF amplifier 13 become almost "0".

Further, along with the fact that light reflected from the surface of the disc can no longer be obtained, as shown in FIG. 5b, also the signal FOK is switched from the high level to the low level. As a result, also the output signal S28 of the AND gate 28 is switched from the high level to the low level, and the connection of the switch SW2a is switched from the terminal a to the terminal b.

By this, as shown in FIG. 5c, the correction operation of the tracking error signal based on the center level V stored in the register 27 is stopped.

Accordingly, the DC component of exactly the amount of correction is continuously input to the tracking servo filter 24, and the tracking servo is prevented from an over-run.

Figure 1:
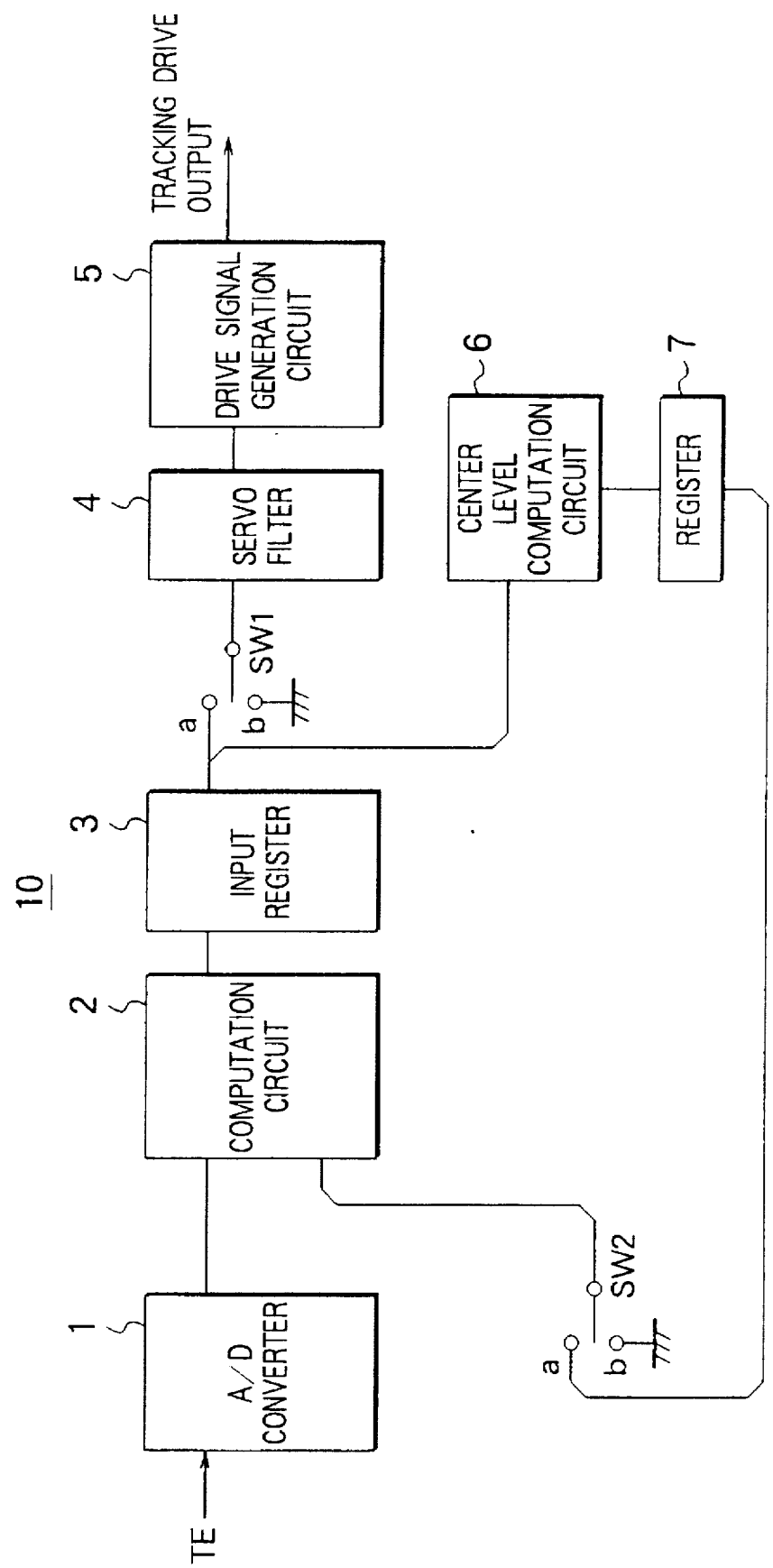
FIG. 1 is a block diagram showing an example of the configuration of the tracking servo circuit of a conventional optical disc player.

Note that, where for example the level control signal TLD is set at the low level (L), even if the signal FOK is switched to the low level, the output signal S28 of the AND gate 28 is held at the high level as it is, so that, similar to the case of the circuit of FIG. 1, the switch SW2a is held while being connected to the terminal a as it is.

Accordingly, even if the signal FOK is switched to the low level, as shown in FIG. 5d, the tracking error signal TESF is corrected.

As explained above, according to the present embodiment, the tracking error signal TE obtained when the tracking servo is OFF is fetched via the A/D converter 21. The center level thereof is calculated by the center level computation circuit 26. That value is stored in the register 27. When the tracking servo is ON, the switches SW1a and SW2a are connected to the terminal a side. In the normal operation mode, the center level stored in the register 27 is subtracted from the tracking error signal TE obtained when the tracking servo is in the ON state at the subtraction circuit 22 so as to correct the offset of the tracking error signal. When light reflected from the surface of the disc can no longer be obtained due to some sort of accidental cause, for example, the existence of a scratch on the surface of the disc, the connection of the switch SW2a is switched from the terminal a to the terminal b in response to the switching of the signal FOK generated based on the RF signal from the high level to the low level. The offset correction operation of the tracking error signal TE based on the center level stored in the register 27 is stopped, and therefore the DC component of exactly the amount of correction is continuously input to the tracking servo filter 24. The over-run of the tracking servo can be prevented, and a more stable tracking servo operation can be realized.

Note that, needless to say the present invention can be similarly applied to a sled servo.

What is claimed is:

1. A tracking servo circuit which obtains a drive output for correction of the position of the light irradiated on the surface of a recording medium by a tracking error signal obtained in accordance with the level of reflection of light irradiated to the surface of the medium, comprising:

a first circuit which obtains a predetermined level of the tracking error signal obtained before the servo-on state is established from the start of driving;

a register which holds said predetermined level of tracking error signal obtained by said first circuit;

a second circuit which corrects said predetermined level of the tracking error signal obtained in the servo-on state based on said predetermined level held in said register; and a third circuit which stops the correction operation of said second circuit when a reflection light from the surface of the medium can no longer be obtained at the time of the servo-on state.

2. A tracking servo circuit as set forth in claim 1, wherein said first circuit comprises a subtraction circuit.

3. A tracking servo circuit as set forth in claim 1, wherein said second circuit is comprised by a subtraction circuit.

4. A tracking servo circuit as set forth in claim 1, further comprising a system control circuit which controls said third circuit based on said level of the tracking error signal.

5. A tracking servo circuit as set forth in claim 4, wherein said third circuit stopping the correction operation of said second circuit is switched by a switching means.

6. A tracking servo circuit as set forth in claim 4, wherein said third circuit is switched by a tracking level control signal and a tracking level disable signal from said system control circuit.

7. A tracking servo circuit as set forth in claim 6, wherein an RF signal is supplied to said third circuit to thereby control said switching operation.

8. A tracking servo circuit as set forth in claim 7, wherein said third circuit is controlled to stop the correction operation of said second circuit when said level of the RF signal is lowered than a predetermined level.

9. A tracking servo circuit as set forth in claim 1, wherein said predetermined level of the tracking error signal is set to as a center level of the tracking error signal.

10. A tracking servo circuit which obtains a drive output for correction of the position of the light irradiated on the surface of a recording medium by a tracking error signal obtained in accordance with the level of reflection of light irradiated to the surface of the medium, comprising:

a first circuit which obtains a predetermined level of the tracking error signal obtained before the servo-on state is established from the start of driving;

a register which holds said predetermined level of tracking error signal obtained by said first circuit;

a second circuit which corrects said predetermined level of the tracking error signal obtained in the servo-on state based on said predetermined level held in said register;

a third circuit which stops the correction operation of the second circuit when a reflection light from the surface of the medium can no longer be obtained at the time of the servo-on state; and servo a filter circuit which inputs the output of said register via a means for switching.

11. A tracking servo circuit as set forth in claim 10, wherein said third circuit is controlled to stop the correction operation of said second circuit when a level of an RF signal is lowered than a predetermined level.

12. A tracking servo circuit as set forth in claim 11, wherein said third circuit stops said correction operation to prevent the application of the DC component contained in the tracking error signal to said servo filter circuit, so that a malfunction of said tracking servo is prevented.

* * * * *